(12) United States Patent
Uramachi (10) Patent No.: US 7,530,267 B2
(45) Date of Patent: May 12, 2009

(54) FLOW RATE MEASURING APPARATUS

(75) Inventor: Hiroyuki Uramachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 11/356,162

(22) Filed: Feb. 17, 2006

(65) Prior Publication Data
US 2007/0068246 A1    Mar. 29, 2007

(30) Foreign Application Priority Data
Sep. 29, 2005   (JP)   ............................. 2005-284047

(51) Int. Cl.
*G01F 1/68* (2006.01)
(52) U.S. Cl. .................... 73/202.5; 73/204.22
(58) Field of Classification Search ................ 73/202.5, 73/204.22
See application file for complete search history.

(56) References Cited

U.S. PATENT DOCUMENTS

| | | | | |
|---|---|---|---|---|
| 4,991,560 | A * | 2/1991 | Arai et al. ................... | 123/494 |
| 4,993,261 | A * | 2/1991 | Lambert ................... | 73/204.21 |
| 5,081,866 | A * | 1/1992 | Ochiai et al. .............. | 73/204.21 |
| 6,474,177 | B2 * | 11/2002 | Maeda et al. ............ | 73/861.63 |
| 6,526,822 | B1 * | 3/2003 | Maeda et al. ............ | 73/204.21 |
| 6,557,408 | B1 * | 5/2003 | Mueller et al. ............. | 73/202.5 |
| 6,578,414 | B2 * | 6/2003 | Kohmura et al. .............. | 73/202 |
| 6,640,627 | B2 * | 11/2003 | Sato et al. ................. | 73/204.22 |
| 6,647,776 | B2 * | 11/2003 | Kohmura et al. ......... | 73/204.21 |
| 6,689,179 | B2 * | 2/2004 | Heinen et al. .............. | 55/385.3 |
| 6,694,810 | B2 * | 2/2004 | Ueyama et al. ............ | 73/204.22 |
| 6,708,560 | B2 * | 3/2004 | Watanabe et al. ........ | 73/204.22 |
| 6,810,730 | B2 * | 11/2004 | Lenzing et al. ............ | 73/202.5 |
| 6,851,311 | B2 * | 2/2005 | Nakada et al. ........... | 73/204.26 |
| 6,868,722 | B2 * | 3/2005 | Tanimoto et al. ............ | 73/202.5 |
| 6,889,545 | B2 * | 5/2005 | Nakada et al. ........... | 73/204.26 |
| 6,952,961 | B2 * | 10/2005 | Kawai et al. ............. | 73/204.22 |
| 7,059,183 | B2 * | 6/2006 | Kikawa et al. ............. | 73/202.5 |

(Continued)

FOREIGN PATENT DOCUMENTS

JP    07-209051 A    8/1995

(Continued)

*Primary Examiner*—Harshad Patel
(74) *Attorney, Agent, or Firm*—Sughrue Mion, PLLC (57) ABSTRACT

A measuring passage includes: an inflow aperture opening onto a vicinity of an end portion of a surface of a main body portion that is perpendicular to a direction of flow of a main flow of a measured fluid so as to be facing upstream; and an outflow aperture opening onto an end surface of the main body portion in a direction of projection. A first passage extends from the inflow aperture in the direction of flow of the main flow to a first bend portion, a second passage extends from the first bend portion so as to be perpendicular to the direction of flow of the main flow toward the circuit housing portion to a second bend portion, a third passage extends from the second bend portion in the direction of flow of the main flow to a third bend portion, a fourth passage extends from the third bend portion in a direction that is perpendicular to the direction of flow of the main flow in a direction away from the circuit housing portion, and a fifth passage extends from the fourth bend portion in a reverse direction to the direction of flow A of the main flow and is connected to the outflow aperture.

18 Claims, 8 Drawing Sheets

U.S. PATENT DOCUMENTS

| | | | |
|---|---|---|---|
| 7,216,535 B2 * | 5/2007 | Kikawa et al. | 73/202.5 |
| 7,293,457 B2 * | 11/2007 | Uramachi et al. | 73/204.22 |
| 2006/0150730 A1 * | 7/2006 | Lenzing et al. | 73/202.5 |

FOREIGN PATENT DOCUMENTS

| | | |
|---|---|---|
| JP | 08-240461 A | 9/1996 |
| JP | 2001-004420 A | 1/2001 |
| JP | 2001-183204 A | 7/2001 |
| JP | 2003-177045 A | 6/2003 |
| JP | 2003-315126 A | 11/2003 |
| JP | 3602762 B2 | 10/2004 |
| WO | 2004/031703 A1 | 4/2004 |
| WO | 2004/046654 A1 | 6/2004 |

* cited by examiner

FLOW RATE MEASURING APPARATUS

BACKGROUND OF THE INVENTION

1. Field of the Invention

The present invention relates to a flow rate measuring apparatus, and relates to an apparatus for measuring mass flow rate of air in an internal combustion engine, for example.

2. Description of the Related Art

Conventional flow rate measuring apparatuses include a bypass passage that bends a plurality of times from an inflow aperture to an outflow aperture, and a flow rate detecting element on which is formed a thermosensitive resistor constituted by a material such as platinum, etc., is disposed internally, and foreign matter such as dust, etc., contained in the measured fluid is decelerated and prevented from striking the flow rate detecting element at high speed by making the bypass passage bend a plurality of times. The outflow aperture of the bypass passage is disposed at a position that is further away from a circuit housing portion than the inflow aperture. (See Patent Literature 1, for example.)

Patent Literature 1: Japanese Patent No. 3602762 (Gazette)

Generally, in automotive internal-combustion engines, since cycles of intake, compression, explosion, and exhaust are performed repeatedly and such engines are constituted by a plurality of cylinders, flow velocity of intake air is a pulsating flow varying over time. Thus, main flow flowing inside a main passage of the internal-combustion engine pulsates at frequencies synchronized with rotational frequencies of the internal-combustion engine, and the lower the frequency, the more convex the radial flow velocity distribution centered on the main passage central axis, and the higher the frequency, the flatter the flow velocity distribution.

In conventional flow rate measuring apparatuses, the inflow aperture and the outflow aperture of the bypass passage are positioned so as to be separated in a radial direction of the main passage. Thus, when conventional flow rate measuring apparatuses are used in automotive internal-combustion engines, since the radial flow velocity distribution in the main passage varies depending on the rotational frequency of the internal-combustion engine even if the flow rate of the intake air flowing through the main passage is equal, differences arise between flow velocities in the vicinities of the inflow aperture and the outflow aperture of the bypass passage due to changes in the rotational frequency despite the amount of intake air being equal, giving rise to differences in the flow velocity of the flow that is induced inside the bypass passage, thereby generating errors in detected flow rate in the flow rate measuring apparatus.

Furthermore, when conventional flow rate measuring apparatuses are used in automotive internal-combustion engines, it is necessary for at least the inflow aperture and the outflow aperture to project inside the main passage, increasing projecting length in a radial direction of the main passage, thereby increasing pressure loss occurring due to the flow rate measuring apparatus being plugged into the main passage.

SUMMARY OF THE INVENTION

The present invention aims to solve the above problems in the related art and provides a flow rate measuring apparatus enabling accurate flow rate measurement and also enabling pressure loss occurring due to plugging into a main passage to be reduced particularly when used to measure intake air flow rate in an automotive internal-combustion engine by suppressing changes in flow velocity inside a measuring passage even if frequencies of pulsating flow synchronized with rotational frequency of the internal-combustion engine differ and flow velocity distribution inside the main passage differs while also preventing foreign matter such as dust, etc., contained in intake air to the internal-combustion engine from striking a flow rate detecting element at high speed and also ensuring effects enabling durability and service life to be improved.

In order to achieve the above object, according to one aspect of the present invention, there is provided a flow rate measuring apparatus including: a main body portion projecting into a main passage, the main body portion having a circuit housing portion disposed internally; a measuring passage formed on the main body portion at a projecting end of the circuit housing portion, a portion of a measured fluid flowing through the main passage being induced to flow through the measuring passage; a flow rate detecting element disposed inside the measuring passage; and a control circuit housed inside the circuit housing portion, the control circuit driving the flow rate detecting element and processing a signal therefrom. The measuring passage includes: an inflow aperture positioned in a vicinity of an end portion of the main body portion in a direction of projection and opening onto a surface of the main body portion that is perpendicular to a direction of flow of a main flow of the measured fluid so as to be facing upstream relative to the direction of flow of the main flow; an outflow aperture positioned in a vicinity of an end portion of the main body portion in the direction of projection and opening onto a surface of the main body portion that is parallel to the direction of flow of the main flow; a first passage extending in the direction of flow of the main flow from the inflow aperture to a first bend portion; a second passage extending from the first bend portion in a direction that is perpendicular to the direction of flow of the main flow toward the circuit housing portion to a second bend portion; a third passage extending from the second bend portion in the direction of flow of the main flow to a third bend portion; and a fourth passage extending from the third bend portion in a direction that is perpendicular to the direction of flow of the main flow in a direction away from the circuit housing portion. The fourth passage is connected to the outflow aperture directly or by means of an additional passage, and the flow rate detecting element is disposed in the third passage.

According to the present invention, because the first bend portion and the second bend portion which bend the flow channel by approximately 90 degrees are disposed in the passage extending from the inflow aperture to the third passage in which the flow rate detecting element is disposed, foreign matter such as dust, etc., in the measured fluid strikes the first bend portion and the second bend portion and is decelerated. Thus, even if foreign matter strikes the flow rate detecting element, its collision energy is small, improving durability and service life of the flow rate detecting element.

Because the inflow aperture and the outflow aperture of the measuring passage are positioned in close proximity to each other in a radial direction of the main passage, even if the rotational frequency changes and the flow velocity distribution inside the main passage changes despite the amount of intake air being equal, differences in flow velocity are less likely to occur in the vicinity of the inflow aperture and the outflow aperture of the measuring passage. Thus, differences are less likely occur in the flow velocity of the flow of the measured fluid that is induced inside the measuring passage, enabling flow rate measurement errors to be reduced.

In addition, because the inflow aperture and the outflow aperture of the measuring passage are positioned in close proximity to each other in the radial direction of the main passage, length of projection of the flow rate measuring apparatus in a radial direction of the main passage can be shortened, enabling pressure loss inside the main passage occurring due to plugging in to be reduced.

DETAILED DESCRIPTION OF THE PREFERRED EMBODIMENTS

Flow rate measuring apparatuses according to preferred embodiments of the present invention will now be explained in detail with reference to the drawings.

Embodiment 1

Figure 1:
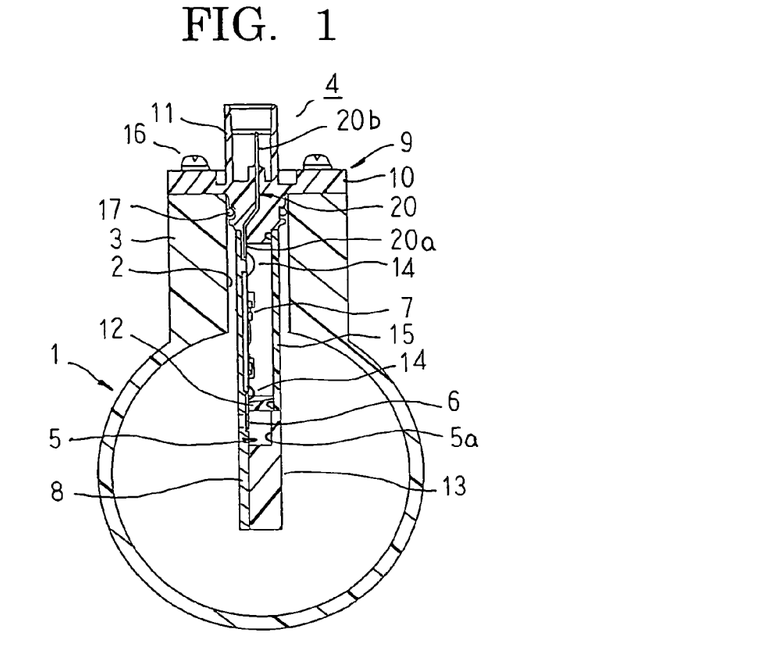
FIG. 1 is a lateral cross section showing a state in which a flow rate measuring apparatus according to Embodiment 1 of the present invention is mounted to a main passage.
Figure 2:
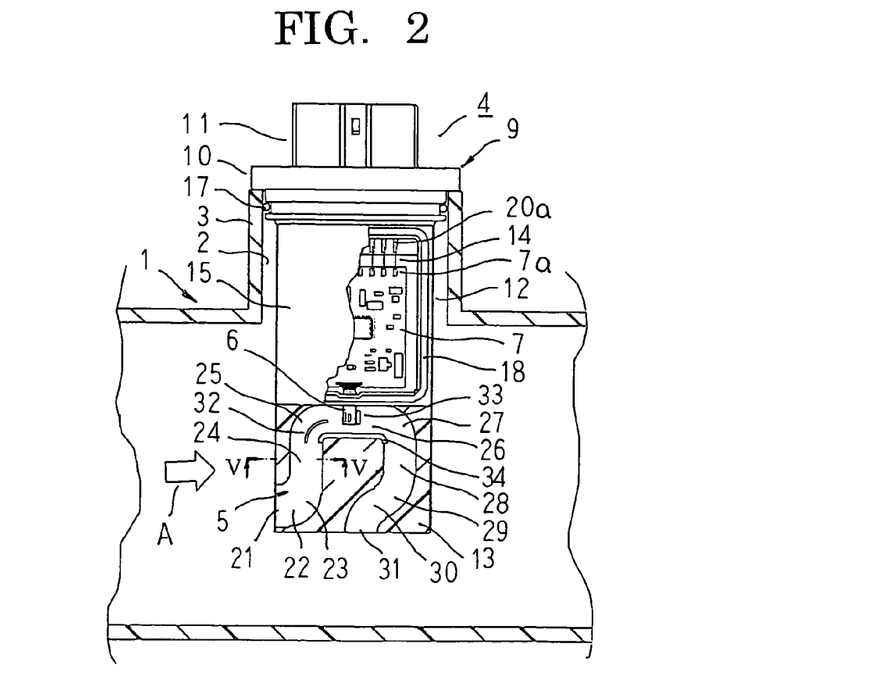
FIG. 2 is a partially cut-away side elevation showing part of the state in which the flow rate measuring apparatus according to Embodiment 1 of the present invention is mounted to the main passage.
Figure 3:
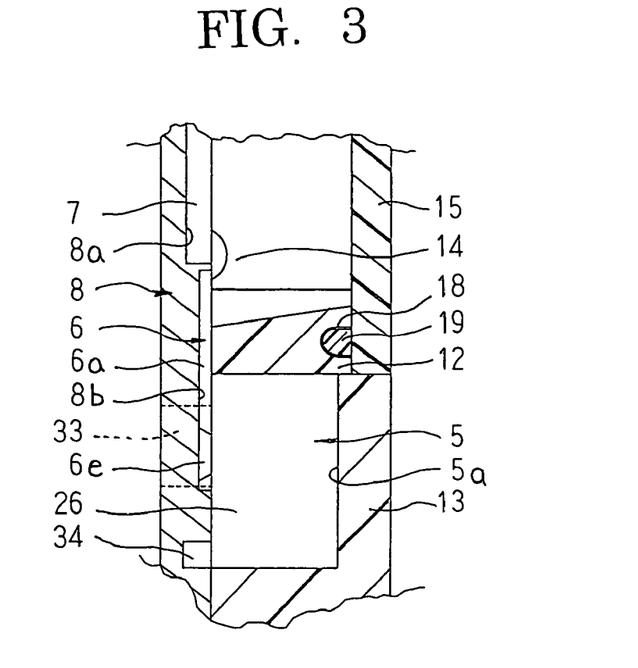
FIG. 3 is a partial enlargement showing a vicinity of a flow rate detecting element from FIG. 1.
Figure 4:
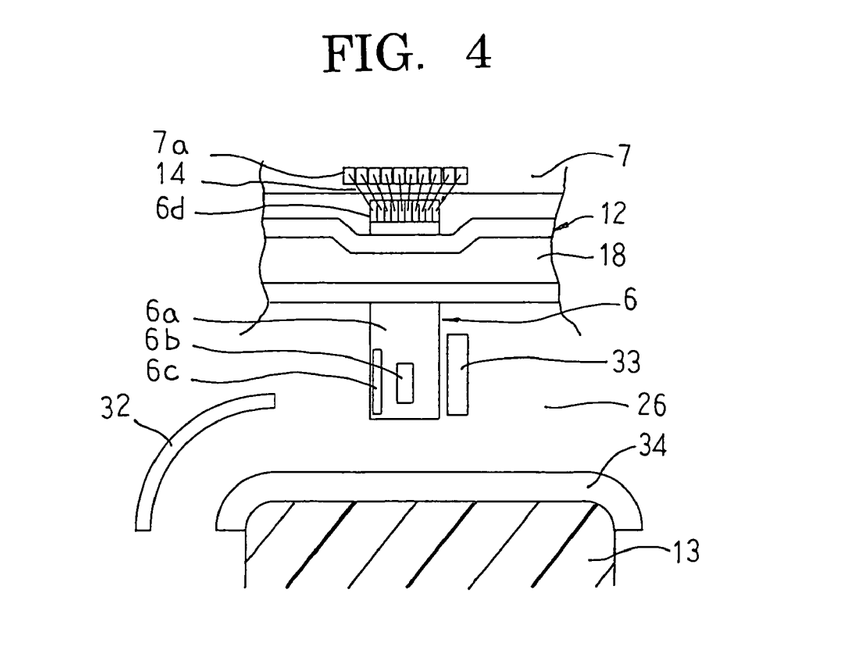
FIG. 4 is a partial enlargement showing a vicinity of the flow rate detecting element from FIG. 2.
Figure 5:
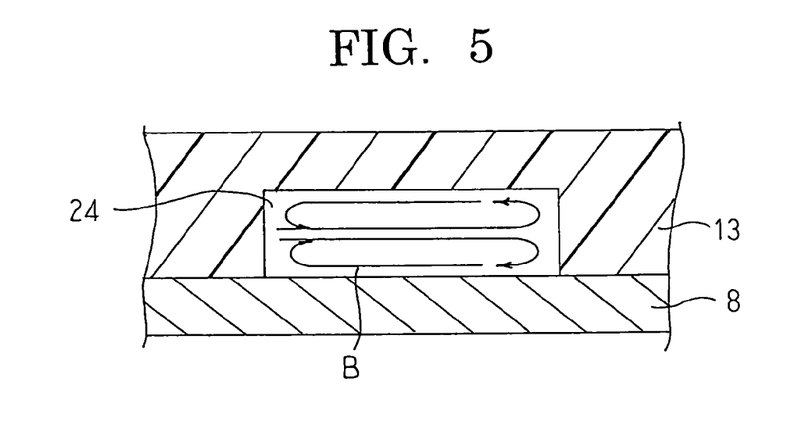
FIG. 5 is a cross section taken along line V-V in FIG. 2 viewed in the direction of the arrows.

FIG. 1 is a lateral cross section showing a state in which a flow rate measuring apparatus according to Embodiment 1 of the present invention is mounted to a main passage, FIG. 2 is a partially cut-away side elevation showing part of the state in which the flow rate measuring apparatus according to Embodiment 1 of the present invention is mounted to the main passage, FIG. 3 is a partial enlargement showing a vicinity of a flow rate detecting element from FIG. 1, FIG. 4 is a partial enlargement showing a vicinity of the flow rate detecting element from FIG. 2, and FIG. 5 is a cross section taken along line V-V in FIG. 2 viewed in the direction of the arrows.

Moreover, here a "lateral cross section" means a cross sectional in a plane that is perpendicular to a central axis of the main passage. In FIG. 2, the main flow of the measured fluid flows in a direction indicated by arrow A in the figure.

In FIGS. 1 through 4, a main passage 1 is a cylindrical pipe body through which a measured fluid flows, and in the case of an automotive internal combustion engine is an air intake passage normally made of a resin and configured integrally with an intake air filtration apparatus (not shown). Here, the measured fluid is air. An insertion aperture 2 for plugging in a flow rate measuring apparatus 4 is disposed in the main passage 1.

The flow rate measuring apparatus 4 includes: a measuring passage 5 disposed inside the main passage 1, a portion of the measured fluid being induced to flow through the measuring passage 5; a flow rate detecting element 6 for detecting a flow rate of the measured fluid flowing through the measuring passage 5; a circuit board 7 on which is configured a control circuit for driving the flow rate detecting element 6 and processing a flow rate detection signal therefrom; a metal plate 8 for holding the flow rate detecting element 6 and the circuit board 7; a base 9 for supporting the metal plate 8; and a measuring passage constituting portion 13 disposed in close proximity to the base 9 and functioning together with the metal plate 8 to constitute the measuring passage 5.

The flow rate detecting element 6 is configured by forming a sensor portion constituted by a flow rate detecting resistor 6b and a temperature compensating resistor 6c on a front surface of a flat, rectangular substrate 6a, and forming input and output terminals 6d that are electrically connected to the flow rate detecting resistor 6b and the temperature compensating resistor 6c at a first end of the front surface of the substrate 6a. Here, the flow rate detecting resistor 6b, the temperature compensating resistor 6c, and the input and output terminals 6d are formed by patterning a thermosensitive resistor film of platinum, nickel, iron-nickel alloy, etc., that has been formed on the front surface of the substrate 6a. Furthermore, a region of formation of the flow rate detecting resistor 6b is formed into a diaphragm construction by removing the substrate 6a from a rear surface to form a cavity 6e. In addition, a heat insulating means (not shown) for making heat from the flow rate detecting resistor 6b less likely to transfer to the temperature compensating resistor 6c is applied to the flow rate detecting element 6. Furthermore, an electrically-insulating material such as silicon or a ceramic, etc., can be used for the material of the substrate 6a.

The metal plate 8 is made by shaping a metal material such as aluminum, or a stainless alloy, etc., into a flat, rectangular shape, and a circuit board housing recess portion 8a and a flow rate detecting element housing recess portion 8b are recessed in close proximity on a front surface thereof. The circuit board 7 is housed in the circuit board housing recess portion 8a and fixed using an adhesive. The flow rate detecting element 6 is housed inside the flow rate detecting element housing recess portion 8b with the input and output terminals 6d positioned near the circuit board 7 and fixed using an adhesive. Moreover, the circuit board 7 and the flow rate detecting element 6 are positioned in a common plane with a front surface of the metal plate 8.

The base 9 includes: a joint portion 10 for ensuring airtightness when the base 9 is inserted into the main passage 1; a connector portion 11 disposed on a first side of the joint portion 10, the connector portion 11 sending and receiving signals between the circuit board 7 and an external portion; and a circuit housing portion 12 disposed on a second side of the joint portion 10, the circuit housing portion 12 enveloping the circuit board housing recess portion 8a and an end of the flow rate detecting element housing recess portion 8b near the circuit board housing recess portion 8a, and the base 9 is molded integrally, for example, using a resin such as polybutylene terephthalate, etc.

The metal plate 8 is fixed to the base 9 using an adhesive with the circuit board 7 and the flow rate detecting element 6 mounted such that the circuit board 7 and the end of the flow rate detecting element 6 having the input and output terminals 6d are exposed inside the circuit housing portion 12. A rear surface of the metal plate 8 is exposed through the base 9.

The measuring passage constituting portion 13 is molded using a resin such as polybutylene terephthalate, for example. A first surface of the measuring passage constituting portion 13 is fixed using an adhesive, etc., to a portion of the metal plate 8 projecting outward from the base 9. The measuring passage groove 5a is recessed into the first surface of the measuring passage constituting portion 13, and functions together with the metal plate 8 to constitute the measuring passage 5, which has a rectangular passage cross section. Moreover, the measuring passage constituting portion 13 may also be molded integrally with the base 9 using a resin.

As shown in FIG. 2, the measuring passage 5 includes: an inflow aperture 21, a first passage 22, a first bend portion 23, a second passage 24, a second bend portion 25, a third passage 26, a third bend portion 27, a fourth passage 28, a fourth bend portion 29, a fifth passage 30, and an outflow aperture 31. The inflow aperture 21 opens facing upstream relative to the direction of flow A of the main flow in a vicinity of an end portion of the flow rate measuring apparatus 4 at an opposite end from the connector portion 11 so as to induce the measured fluid to flow into the measuring passage 5. The outflow aperture 31 opens onto an end surface of the flow rate measuring apparatus 4 at the opposite end from the connector portion 11 so as to induce the measured fluid to flow out of the measuring passage 5. The end surface of the flow rate measuring apparatus 4 at the opposite end from the connector portion 11 is a surface that is generally parallel to the direction of flow A of the main flow.

The first passage 22 is disposed so as to extend from the inflow aperture 21 in the direction of flow A of the main flow to the first bend portion 23. The second passage 24 is disposed so as to extend from the first bend portion 23 in a direction that is generally perpendicular to the direction of flow A of the main flow toward the circuit board 7 to the second bend portion 25. The third passage 26 is disposed in close proximity to the circuit housing portion 12 so as to extend from the second bend portion 25 in the direction of flow A of the main flow to the third bend portion 27. The fourth passage 28 is disposed so as to extend from the third bend portion 27 in a direction that is generally perpendicular to the direction of flow A of the main flow away from the circuit board 7 to the fourth bend portion 29. The fifth passage 30 is disposed so as to extend from the fourth bend portion 29 in a reverse direction to the direction of flow A of the main flow to the outflow aperture 31. The first bend portion 23, the second bend portion 25, the third bend portion 27, and the fourth bend portion 29 are portions that bend the direction of flow of the fluid being measured by approximately 90 degrees, and their respective inner peripheral wall surfaces and outer circumferential wall surfaces are formed into arc shapes having a predetermined radius of curvature.

An arc-shaped suppressing plate 32 is formed at the second bend portion 25 linking the second passage 24 and the third passage 26, and suppresses secondary flows arising at the first bend portion 23 and arising at the second bend portion 25. A first communicating aperture 33 is disposed through the metal plate 8 at a position downstream from the flow rate detecting element 6 so as to communicate between the third passage 26 and the main passage 1. In addition, a drainage groove 34 is recessed into the metal plate 8 beside a wall surface of the third passage 26 on an opposite side from the circuit board 7 so as to extend from the second bend portion 25 to the third bend portion 27.

The region of formation of the flow rate detecting resistor 6b and the temperature compensating resistor 6c on the flow rate detecting element 6 is exposed inside the third passage 26 of the measuring passage 5. The flow rate detecting element 6 is disposed such that the flow rate detecting resistor 6b constituting the flow rate detector portion is offset in a direction that is perpendicular to the direction of flow A of the main flow and also closer to the circuit board 7 relative to a center of the third passage 26 in a direction that is aligned with the circuit board 7.

A plurality of insert conductors 20 are insert-molded into the base 9 such that a first end 20a of each is exposed inside the circuit housing portion 12 and a second end 20b of each is exposed inside the connector portion 11. The input and output terminals 6d of the flow rate detecting element 6 and the electrode terminals 7a of the circuit board 7 are wire-bonded using wires 14, and the electrode terminals 7a of the circuit board 7 and the first ends 20a of the insert conductors 20 are wire-bonded using wires 14. Moreover, wire bonding has been explained as an example of an electrical connection technique, but electrical connection methods such as welding, soldering, etc., may also be used.

In addition, a resin cover 15 is fixed so as to cover the circuit housing portion 12 using an adhesive 19 applied to outer peripheral grooves 18 of the circuit housing portion 12. Here, although not shown, the circuit housing portion 12 is charged with a sealing gel.

In a flow rate measuring apparatus 4 configured in this manner, a main body portion positioned on the second side of the joint portion 10 constituted by a projecting portion of the base 9, the metal plate 8, the measuring passage constituting portion 13, and the cover 15 is formed into a rectangular parallelepiped having a cross section perpendicular to its direction of projection that is a rectangular shape. The main body portion is contained inside an outline of the joint portion 10 when viewed from the direction of projection. First and second wall surfaces constituted by long sides of the rectangular cross section of the main body portion that is perpendicular to the direction of projection are constituted by a rear surface of the metal plate 8, and by a second surface of the measuring passage constituting portion 13 and a front surface of the cover 15, respectively. In addition, the inflow aperture 21 of the measuring passage 5 is formed in a vicinity of a second end portion of a first of two wall surfaces constituted by short sides of the rectangular cross section of the main body portion that is perpendicular to the direction of projection, in other words, in a vicinity of a leading end portion of the main body portion in the direction of projection, and the outflow aperture 31 of the measuring passage 5 is formed on an end surface of the main body portion in the direction of projection.

This flow rate measuring apparatus 4 is mounted by inserting the main body portion into the insertion aperture 2 so as to project inside the main passage 1, and securely fastening a flange portion of the joint portion 10 to the flange portion 3 of the main passage 1 using screws 16. This flow rate measuring apparatus 4 is plugged into the main passage 1 such that the wall surfaces constituted by the long sides of the rectangular cross section of the main body portion that is perpendicular to the direction of projection are generally parallel to the direction of flow A of the main flow of the measured fluid flowing through the main passage 1, and also such that the first wall surface constituted by the short side of the rectangular cross section of the main body portion is facing upstream so as to be perpendicular to the direction of flow A. An O ring 17 is interposed between the joint portion 10 and the insertion aperture 2 to ensure airtightness. Here, the inflow aperture 21 of the measuring passage 5 opens on a surface that is perpendicular to the direction of flow A of the main flow in a vicinity of an end portion projecting inside the main passage 1, and the outflow aperture 31 opens on an end surface projecting inside the main passage 1 that is a surface that is parallel to the direction of flow A of the main flow.

The measured fluid flowing through the main passage 1 flows into the measuring passage 5 through the inflow aperture 21, flows through the first passage 22 in the direction of flow A of the main flow, has its direction of flow deflected by approximately 90 degrees by the first bend portion 23, and flows through the second passage 24 in a direction that is perpendicular to the direction of flow A of the main flow. Next, the measured fluid has its direction of flow deflected by approximately 90 degrees by the second bend portion 25, flows through the third passage 26 in the direction of flow A of the main flow, and flows over the surface of the flow rate detecting element 6. Then, the measured fluid has its direction of flow deflected by approximately 90 degrees by the third bend portion 27, and flows through the fourth passage 28 in a direction that is perpendicular to the direction of flow A of the main flow. Finally, the measured fluid has its direction of flow deflected by approximately 90 degrees by the fourth bend portion 29, flows through the fifth passage 30 in a reverse direction to the direction of flow A of the main flow, and is discharged into the main passage 1 through the outflow aperture 31.

External electric power is supplied from the connector portion 11 through the insert conductors 20 to the control circuit configured on the circuit board 7. This control circuit controls an excitation current flowing to the flow rate detecting resistor 6b, for example, such that the flow rate detecting resistor 6b is at a predetermined temperature difference greater than the temperature of the measured fluid detected at the temperature compensating resistor 6c.

At that time, if the flow rate of the measured fluid is large, the quantity of heat transferred from the flow rate detecting resistor 6b to the measured fluid increases, reducing the temperature of the flow rate detecting resistor 6b. Then, the control circuit increases the quantity of electric current passed to the flow rate detecting resistor 6b so as to compensate for the quantity of heat transferred to the measured fluid to maintain the temperature of the flow rate detecting resistor 6b at the predetermined temperature difference. Conversely, if the flow rate of the measured fluid decreases, the quantity of heat transferred from the flow rate detecting resistor 6b to the measured fluid is reduced, and the temperature of the flow rate detecting resistor 6b rises. Then, the control circuit decreases the quantity of electric current passed to the flow rate detecting resistor 6b to maintain the temperature of the flow rate detecting resistor 6b at the predetermined temperature difference.

Thus, the flow rate of the measured fluid flowing through the measuring passage 5, which has a predetermined passage cross-sectional area, is detected by detecting the value of the excitation current flowing to the flow rate detecting resistor 6b and outputting it as a flow rate signal for the measured fluid. The flow velocity of the measured fluid can also be similarly measured.

According to Embodiment 1, because the first bend portion 23 and the second bend portion 25 are disposed in a passage extending from the inflow aperture 21 to the third passage 26 in which the flow rate detecting element 6 is disposed, the measured fluid has its direction of flow deflected by approximately 90 degrees at the first bend portion 23 and at the second bend portion 25. Here, if foreign matter such as dust, etc., is included in the measured fluid, the foreign matter strikes the first bend portion 23 and the second bend portion 25 and is decelerated since its inertial mass is large. Thus, foreign matter that reaches the third passage 26 is sufficiently reduced in speed, and even if the foreign matter happens to strike the flow rate detecting element 6, its collision energy is small, improving durability and service life of the flow rate detecting element 6.

The main flow which flows through the main passage 1 of an internal-combustion engine is a pulsating flow accompanying the opening and closing of the intake valve of the internal-combustion engine. The magnitude of this pulsation is relatively small when the degree of opening of the engine throttle valve is small, increases as the degree of opening of the throttle valve increases, and also increases together with increases in flow rate in the main flow. If this pulsation increases to a certain degree, negative errors (lean errors) are generated in a flow rate measuring apparatus that is not equipped with a measuring passage to circumvent the main flow due to non-linear characteristics in flow rate measurement by the flow rate detecting resistor 6b and response lag characteristics in the flow rate detecting resistor 6b itself. Thus, conventionally, by providing a measuring passage to circumvent the main flow, pulsation inside the measuring passage is reduced by inertial effect to reduce the negative errors described above.

In this flow rate measuring apparatus 4, because the measuring passage 5 is configured so as to extend from the inflow aperture 21 to the outflow aperture 31 and bend within a plane including the direction of flow A of the main flow and the direction of projection of the main body portion, passage length can be lengthened as much as possible from the inflow aperture 21 to the outflow aperture 31 within the limited space of the measuring passage constituting portion 13 at the leading edge in the direction of projection of the main body portion. Thus, greater inertial effect can be effectively obtained, further reducing the negative errors described above. Specifically, values output from the flow rate detecting element 6 that are made lean as a result of the non-linear characteristics in the flow rate measurement by the flow rate detecting resistor 6b and the response lag characteristics in the flow rate detecting resistor 6b itself are compensated for by the passage shape of the measuring passage 5 so as to be richer, reducing flow rate measurement errors.

The main flow flowing through the main passage 1 of the internal-combustion engine pulsates at frequencies synchronized with a rotational frequency of the internal-combustion engine, and the lower the frequency, the more convex the radial flow velocity distribution centered on the central axis of the main passage 1, and the higher the frequency, the flatter the flow velocity distribution. In other words, even if the flow rate of the measured fluid flowing through the main passage 1 is equal, the radial flow velocity distribution in the main passage 1 varies depending on the rotational frequency of the internal-combustion engine. Even if the rotational frequency changes and the flow velocity distribution inside the main passage 1 changes in this manner despite the amount of intake air being equal, differences in the flow velocity in the vicinity of the inflow aperture 21 and the outflow aperture 31 of the measuring passage 5 are less likely to occur in this flow rate measuring apparatus 4 since the inflow aperture 21 and the outflow aperture 31 of the measuring passage 5 are positioned in close proximity to each other in the radial direction of the main passage 1. Thus, differences are less likely to occur in the flow velocity of the flow of measured fluid that is induced inside the measuring passage 5, enabling flow rate measurement errors to be further reduced in the flow rate measuring apparatus 4.

Because the inflow aperture 21 and the outflow aperture 31 of the measuring passage 5 of this flow rate measuring apparatus 4 are positioned in close proximity to each other in the radial direction of the main passage 1, the inflow aperture 21 and the outflow aperture 31 can both be disposed in the vicinity of the central axis of the main passage 1 even if the inside diameter of the main passage 1 is small. Thus, even if the radial flow velocity distribution of the main passage 1 changes due to changes in the rotational frequency of the internal-combustion engine, this embodiment is preferable because flow velocity differences inside the measuring passage 5 are kept to a minimum, enabling flow rate measurement errors to be reduced.

In addition, flow rate measurement is possible simply by projecting at least the vicinity of the end portion of the flow rate measuring apparatus 4 oh which the inflow aperture 21 and the outflow aperture 31 are disposed inside the main passage 1 when this flow rate measuring apparatus 4 is disposed inside the main passage 1. The projecting length of the flow rate measuring apparatus 4 can thereby be minimized in the radial direction of the main passage 1. Thus, pressure loss arising due projection of the flow rate measuring apparatus 4 inside the main passage 1 can be reduced to a minimum.

By deflecting vectors of flow inside the measuring passage 5 by approximately 90 degrees at the second bend portion 25 upstream from the third passage 26 where the flow rate detecting element 6 is installed, the flow velocity distribution becomes fast on an outer peripheral side of the second bend portion 25, that is, on a side near the circuit board 7, and slow on an inner peripheral side.

Here, because the flow rate detecting resistor 6b formed on the flow rate detecting element 6 is disposed so as to be offset from the center of the third passage 26 toward the circuit board 7, the flow rate measurement is less likely to be affected by the slow flow velocity on the inner peripheral side of the second bend portion 25, which is an unstable, eddying flow. In other words, sensitivity of the flow rate detecting element 6 to the flow rate is improved because the flow rate detecting resistor 6b is disposed at a position of comparatively high flow velocity. Thus, the signal-to-noise ratio of output from the flow rate measuring apparatus 4 can be increased.

Because the first communicating aperture 33 is disposed through the metal plate 8 at a position downstream from the flow rate detecting element 6 so as to communicate between the third passage 26 and the main passage 1, a portion of the measured fluid flowing through the third passage 26 is sucked out into the main passage 1 from the first communicating aperture 33. A wall boundary layer above the front surface of the flow rate detecting element 6 is thereby reduced in thickness, effectively enabling the flow velocity of the measured fluid flowing through the third passage 26 to be increased, whereby sensitivity of the flow rate detecting element 6 to the flow rate is improved. Thus, the signal-to-noise ratio of output from the flow rate measuring apparatus 4 can be increased.

In addition, by deflecting the vectors of flow inside the measuring passage 5 by approximately 90 degrees in the first bend portion 23 and the second bend portion 25, the flow velocity distribution becomes fast on the outer peripheral sides and slow on the inner peripheral sides of the first and second bend portions 23 and 25. In the first bend portion 23, the measured fluid flows from the inner peripheral side where the flow velocity is slow to the outer peripheral side where the flow velocity is high as a result of this kind of flow velocity distribution. Flow velocity components that circle within the passage cross section of the second passage 24 as indicated by arrows B in FIG. 5, that is, secondary flows, are thereby generated in the second passage 24. Similarly, the measured fluid also flows from the inner peripheral side where the flow velocity is slow to the outer peripheral side where the flow velocity is high at the second bend portion 25, generating secondary flows in the third passage 26. If flows of this kind reach the flow rate detecting element 6, they cross the flow inside the third passage 26 that is generally parallel to the direction of flow A of the main flow that is the original object of measurement and become noise. In Embodiment 1, because the arc-shaped suppressing plate (rail) 32 is disposed in the second bend portion 25 so as to separate the inner peripheral side and the outer peripheral side, flow of the measured fluid from the inner peripheral side to the outer peripheral side is impeded by the suppressing plate 32, preventing secondary flows from reaching the flow rate detecting element 6. Thus, the signal-to-noise ratio of output from the flow rate measuring apparatus 4 can be increased.

The intake air of the automotive internal-combustion engine may also include water droplets, and if these adhere to the flow rate detecting resistor 6b of the flow rate measuring apparatus 4, output fluctuations in the flow rate measuring apparatus 4 increase, preventing accurate flow rate measurement. In Embodiment 1, water droplets of this kind adhere to wall surfaces of the first bend portion 23 and the second bend portion 25 and collect particularly at positions where the flow velocity is slow and forms eddies on the inner peripheral sides of the first and second bend portions 23 and 25. These water droplets are gathered into the drainage groove 34 formed beside the wall surface of the third passage 26 on the opposite side from the circuit board 7, are guided by the drainage groove 34, and blown downstream from the third bend portion 25. Thus, the water droplets are less likely to adhere to the flow rate detecting resistor 6b of the flow rate detecting element 6, suppressing output fluctuations in the flow rate measuring apparatus 4.

Because the flow rate detecting element 6 is disposed so as to be positioned in a common plane with the metal plate 8, disturbances are not generated in the measured fluid at boundaries between the metal plate 8 and the flow rate detecting element 6, making accurate flow rate measurement possible.

In automotive internal-combustion engines, the intake valve may also begin to open before an exhaust valve has closed at the end of an exhaust stroke in order to make use of inertial characteristics of the intake air to increase intake air efficiency. In that case, when the rotational frequency of the internal-combustion engine and the degree of opening of the throttle valve, etc., meet certain conditions, surges are generated including those known as "backflow", in which the intake air blows back upstream. If the flow rate measuring apparatus does not have a function for determining the flow direction of the measured fluid, rich errors may arise due to a backflow being detected as a forward flow.

Here, however, because the outflow aperture 31 opens onto the end surface of the flow rate measuring apparatus 4 at the opposite end from the connector portion 11, which is a surface that is generally parallel to the direction of flow A of the main flow, the outflow aperture 31 opens in a direction that is generally perpendicular to the backflow direction of the main flow. Thus, even if surges including backflows are generated, the measured fluid is prevented from flowing into the measuring passage 5 through the outflow aperture 31. Furthermore, because the fifth passage 30 is disposed so as to extend from the fourth bend portion 29 in a reverse direction to the direction of flow A of the main flow to the outflow aperture 31, even if the measured fluid does happen to flow in through the outflow aperture 31 slightly, it flows from the outflow aperture 31 through the fifth passage 30 in a direction opposite to the backflow direction and is damped. Thus, a backflow will not be detected as a forward flow and give rise to rich errors.

Moreover, in Embodiment 1 above, the drainage groove 34 is formed on the metal plate 8 beside the wall surface of the third passage 26 on the opposite side from the circuit board 7 so as to extend from the second bend portion 25 to the third bend portion 27, but a drainage groove may also be formed on the wall surface of the third passage 26 on the opposite side from the circuit board 7 so as to extend from the second bend portion 25 to the third bend portion 27.

In Embodiment 1 above, the first communicating aperture 33 is disposed through the metal plate 8 at a position downstream from the flow rate detecting element 6 so as to communicate between the third passage 26 and the main passage 1, but a first communicating aperture may also be disposed through the measuring passage constituting portion 13 at a position downstream from the flow rate detecting element 6 so as to communicate between the third passage 26 and the main passage 1.

In Embodiment 1 above, the outflow aperture 31 opens onto the end surface of the flow rate measuring apparatus 4 at the opposite end from the connector portion 11, but it is only necessary for an outflow aperture to be in close proximity to the inflow aperture 21 relative to the radial direction of the main passage 1 and open on a surface that is generally parallel to the direction of flow A of the main flow and, for example, may also be disposed through the metal plate 8 or the measuring passage constituting portion 13 in a vicinity of the end portion at the opposite end from the connector portion 11 so as to communicate between the fifth passage 30 and the main passage 1.

Embodiment 2

Figure 6:
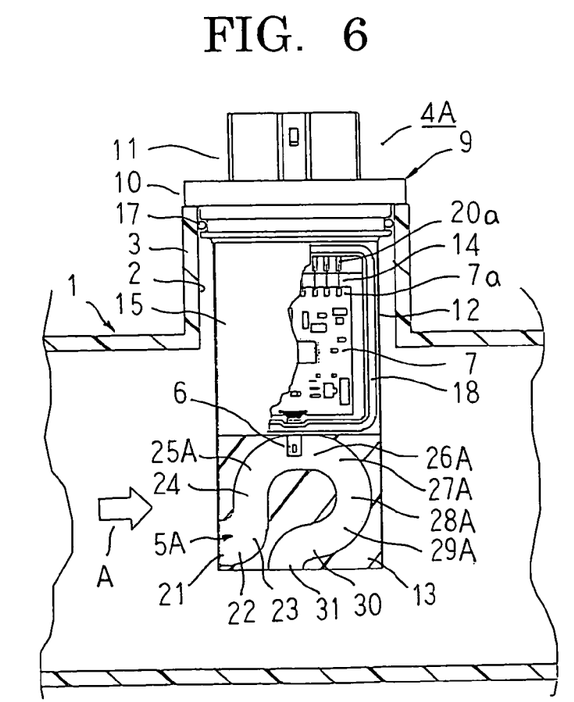
FIG. 6 is a partially cut-away side elevation showing part of a state in which a flow rate measuring apparatus according to Embodiment 2 of the present invention is mounted to a main passage.

FIG. 6 is a partially cut-away side elevation showing part of a state in which a flow rate measuring apparatus according to Embodiment 2 of the present invention is mounted to a main passage. Moreover, since lateral cross sections in each of the embodiments are similar to FIG. 1 in Embodiment 1 above, they will be omitted.

In FIG. 6, a measuring passage 5A includes: an inflow aperture 21, a first passage 22, a first bend portion 23, a second passage 24, a second bend portion 25A, a third passage 26A, a third bend portion 27A, a fourth passage 28A, a fourth bend portion 29A, a fifth passage 30, and an outflow aperture 31.

Outer peripheral wall surfaces of the second bend portion 25A, the third passage 26A, the third bend portion 27A, the fourth passage 28A, and the fourth bend portion 29A are formed into a continuous arc-shaped surface by increasing a radius of curvature of the outer peripheral wall surfaces of the second bend portion 25A, the third bend portion 27A, and the fourth bend portion 29A.

Moreover, the rest of this embodiment is configured in a similar manner to Embodiment 1 above.

In a flow rate measuring apparatus 4A configured in this manner, because the outer peripheral wall surfaces of the second bend portion 25A, the third passage 26A, the third bend portion 27A, the fourth passage 28A, and the fourth bend portion 29A are formed into a continuous, smooth arc-shaped surface, the measured fluid flowing through the measuring passage 5A is deflected along the continuous, smooth arc-shaped outer peripheral wall surface, reducing disturbances in the flow of measured fluid that is induced inside the measuring passage 5A. Thus, because disturbances in the flow of the measured fluid above the flow rate detecting element 6 are also reduced and pressure loss inside the measuring passage 5A is also reduced, the flow velocity of the measured fluid flowing through the measuring passage 5A is increased. The signal-to-noise ratio of output from the flow rate measuring apparatus 4A is thereby improved.

Embodiment 3

Figure 7:
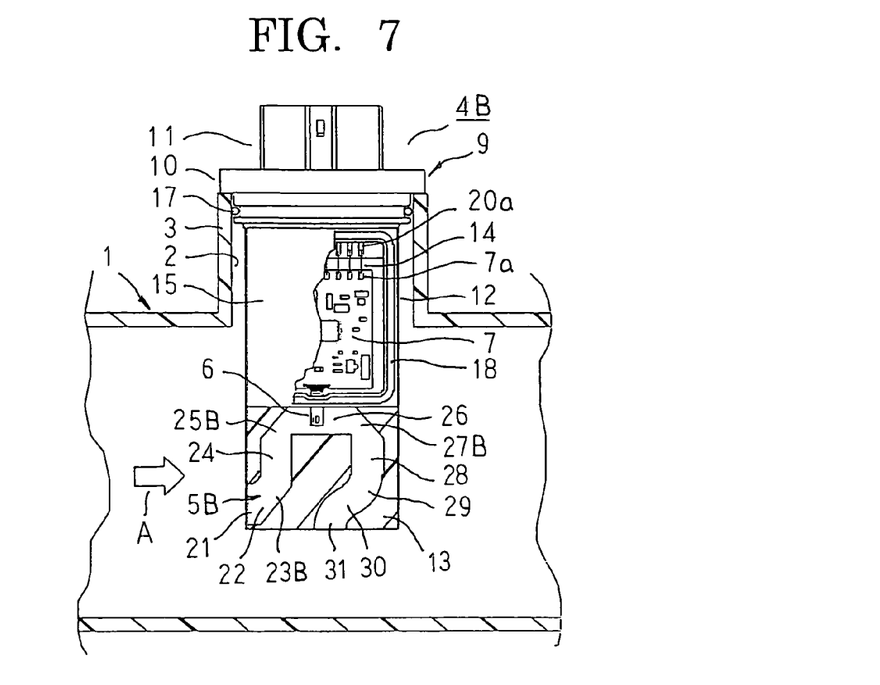
FIG. 7 is a partially cut-away side elevation showing part of a state in which a flow rate measuring apparatus according to Embodiment 3 of the present invention is mounted to a main passage.

FIG. 7 is a partially cut-away side elevation showing part of a state in which a flow rate measuring apparatus according to Embodiment 3 of the present invention is mounted to a main passage.

In FIG. 7, a measuring passage 5B includes: an inflow aperture 21, a first passage 22, a first bend portion 23B, a second passage 24, a second bend portion 25B, a third passage 26, a third bend portion 27B, a fourth passage 28, a fourth bend portion 29, a fifth passage 30, and an outflow aperture 31.

Outer peripheral wall surfaces of the first bend portion 23B, the second bend portion 25B, and the third bend portion 27B are formed so as to have inclined surfaces in which a flat surface is inclined so as to deflect the measured fluid by approximately 90 degrees.

Moreover, the rest of this embodiment is configured in a similar manner to Embodiment 1 above.

In the flow rate measuring apparatus 4 according to Embodiment 1 above, if the radius of curvature of the first bend portion 23 is small, the flow velocity on the inner peripheral side of the first bend portion 23 becomes slow, generating an unstable eddy. Moreover, unstable eddies may also be similarly generated on the inner peripheral sides of the second bend portion 25 and the third bend portion 27.

In a flow rate measuring apparatus 4B according to Embodiment 3, because the outer peripheral wall surfaces of the first through third bend portions 23B, 25B, and 27B, that is, the surfaces opposite the eddies described above, are formed into inclined surfaces, the passage cross-sectional area of the measuring passage 5B is reduced. Because the wall boundary layers in a width direction of the measuring passage 5B at the first through third bend portions 23B, 25B, and 27B are compressed, and the flow velocity distribution is thereby corrected, the eddies described above are reduced. As a result, disturbances to the flow of the measured fluid that is induced inside the measuring passage 5B are reduced, disturbances to the flow above the flow rate detecting element 6 are also reduced, and pressure loss inside the measuring passage 5B is also reduced, increasing the flow velocity. Thus, the signal-to-noise ratio of output from the flow rate measuring apparatus 4B is improved.

Moreover, the "width direction" of the measuring passage 5B means a thickness direction of the flow rate detecting element 6, in other words, a direction that is perpendicular to the surface of the page in FIG. 7.

Embodiment 4

Figure 8:
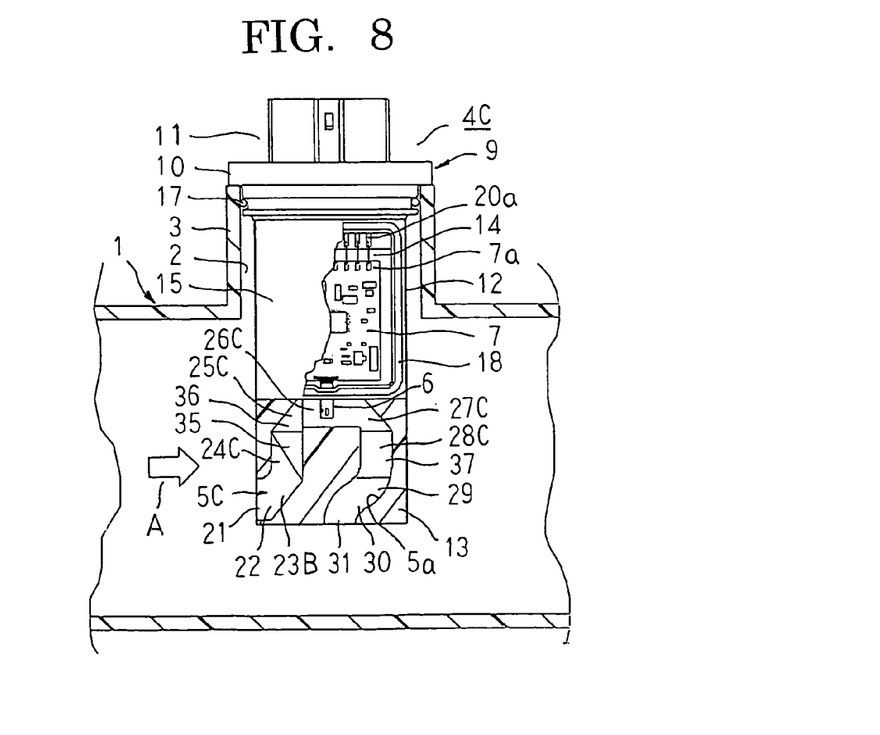
FIG. 8 is a partially cut-away side elevation showing part of a state in which a flow rate measuring apparatus according to Embodiment 4 of the present invention is mounted to a main passage.

FIG. 8 is a partially cut-away side elevation showing part of a state in which a flow rate measuring apparatus according to Embodiment 4 of the present invention is mounted to a main passage.

In FIG. 8, a measuring passage 5C includes: an inflow aperture 21, a first passage 22, a first bend portion 23B, a second passage 24C, a second bend portion 25C, a third passage 26C, a third bend portion 27C, a fourth passage 28C, a fourth bend portion 29, a fifth passage 30, and an outflow aperture 31.

Outer peripheral wall surfaces of the first bend portion 23B, the second bend portion 25C, and the third bend portion 27C are formed so as to have inclined surfaces in which a flat surface is inclined so as to deflect the measured fluid by approximately 90 degrees. A portion of a measuring passage groove 5a of a measuring passage constituting portion 13 constituting the second passage 24C and the second bend portion 25C is formed so as to have a depth that becomes gradually shallower continuously from the second passage 24C through the second bend portion 25C to an entrance of the third passage 26C to constitute flow contracting portions 35 and 36 in which the passage cross-sectional area is continuously constricted. A portion of the measuring passage groove 5a constituting the third passage 26C and the third bend portion 27C is formed so as to have a depth that is equal to the depth of the measuring passage groove 5a at the entrance of the third passage 26C. In addition, a portion of the measuring passage groove 5a constituting the fourth passage 28C is formed so as to have a depth that becomes gradually deeper continuously from a passage entrance of the fourth passage 28C to partway along the fourth passage 28C to constitute an expanding portion 37 in which the passage cross-sectional area is continuously expanded.

Moreover, the rest of this embodiment is configured in a similar manner to Embodiment 3 above.

In a flow rate measuring apparatus 4C configured in this manner, the flow rate detecting element 6 is disposed partway along the third passage 26C so as to be positioned in a common plane with a wall surface constituting the measuring passage 5C (the front surface of the metal plate 8), and the flow of the measured fluid above that wall surface is measured. Consequently, by constricting the passage cross-sectional area in the thickness direction of the flow rate detecting element 6 at the flow contracting portions 35 and 36, a wall boundary layer in the thickness direction of the flow rate detecting element 6 is compressed, correcting flow velocity distributions. Thus, the flow velocity increases immediately upstream from the flow rate detecting element 6, also reducing disturbances to the flow above the flow rate detecting element 6.

Because dynamic pressure gained in the flow contracting portions 35 and 36 is gradually converted to static pressure as the flow that has passed over the flow rate detecting element 6 passes through the expanding portion 37, static pressure is recovered uniformly. Fluid separation above the wall surface is thereby suppressed, enabling pressure loss inside the measuring passage 5C to be reduced, and increasing flow velocity inside the measuring passage 5C. Thus, the signal-to-noise ratio of output from the flow rate measuring apparatus 4C is improved.

Embodiment 5

Figure 9:
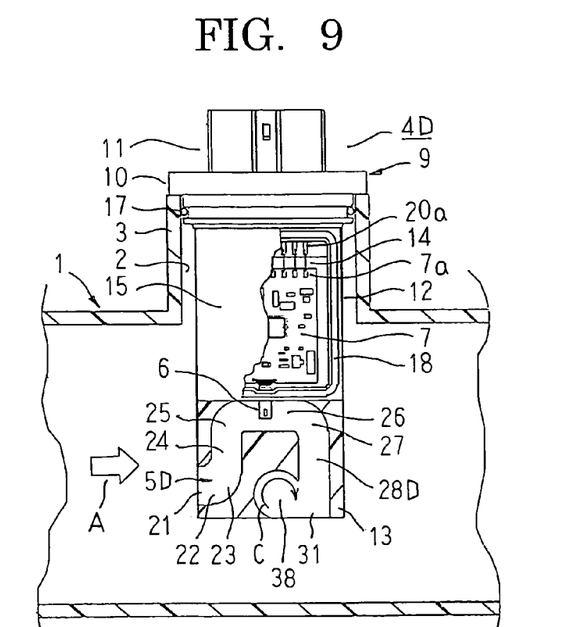
FIG. 9 is a partially cut-away side elevation showing part of a state in which a flow rate measuring apparatus according to Embodiment 5 of the present invention is mounted to a main passage.

FIG. 9 is a partially cut-away side elevation showing part of a state in which a flow rate measuring apparatus according to Embodiment 5 of the present invention is mounted to a main passage.

In FIG. 9, a measuring passage 5D includes: an inflow aperture 21, a first passage 22, a first bend portion 23, a second passage 24, a second bend portion 25, a third passage 26, a third bend portion 27, a fourth passage 28D, a passage cross-sectional area expanding portion 38, and an outflow aperture 31. The fourth passage 28D of the measuring passage 5D is disposed so as to extend from the third bend portion 27 in a direction that is generally perpendicular to the direction of flow A of the main flow away from the circuit board 7 to the fourth bend portion 29, and is directly connected to the outflow aperture 31. The passage cross-sectional area expanding portion 38 has a circular cross-sectional shape in a plane including the direction of flow A of the main flow and the direction of projection of the flow rate measuring apparatus 4D into the main passage 1, and is disposed at an upstream end of the fourth passage 28D so as to connect to the fourth passage 28D and the outflow aperture 31.

Moreover, the rest of this embodiment is configured in a similar manner to Embodiment 1 above.

In a flow rate measuring apparatus 4D configured in this manner, the passage cross-sectional area expanding portion 38 is connected to the fourth passage 28 and the outflow aperture 31 at an upstream end of the fourth passage 28D.

Thus, if surges including backflows are generated, and the measured fluid flows in through the outflow aperture 31 slightly, it will first enter the passage cross-sectional area expanding portion 38. Then, the measured fluid that has entered the passage cross-sectional area expanding portion 38 circles around in the direction indicated by arrow C in FIG. 9 due to the circular cross-sectional shape of the passage cross-sectional area expanding portion 38. This flow of measured fluid circling around inside the passage cross-sectional area expanding portion 38 acts so as to accelerate the measured fluid inside the fourth passage 28D in a direction that discharges it from the outflow aperture 31. The measured fluid is thereby less likely to flow back through the outflow aperture 31. Thus, a backflow will not be detected as a forward flow and give rise to rich errors.

Embodiment 6

Figure 10:
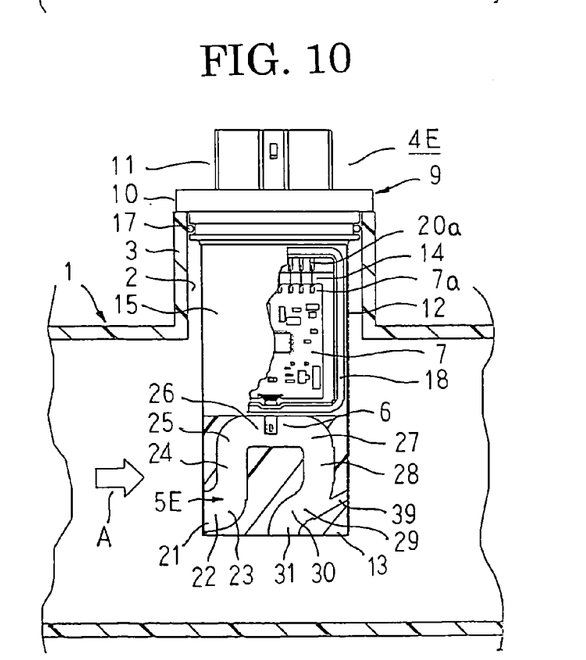
FIG. 10 is a partially cut-away side elevation showing part of a state in which a flow rate measuring apparatus according to Embodiment 6 of the present invention is mounted to a main passage.

FIG. 10 is a partially cut-away side elevation showing part of a state in which a flow rate measuring apparatus according to Embodiment 6 of the present invention is mounted to a main passage.

In FIG. 10, a measuring passage 5E includes: an inflow aperture 21, a first passage 22, a first bend portion 23, a second passage 24, a second bend portion 25, a third passage 26, a third bend portion 27, a fourth passage 28, a fourth bend portion 29, a fifth passage 30, a second communicating aperture 39, and an outflow aperture 31. The second communicating aperture 39 is disposed through the measuring passage constituting portion 13 so as to be inclined relative to the direction of flow A of the main flow such that an aperture direction is gradually separated from the circuit housing portion 12 toward an upstream end, and so as to communicate between the fourth bend portion 29 and the main passage 1 downstream from the measuring passage constituting portion 13.

Moreover, the rest of this embodiment is configured in a similar manner to Embodiment 1 above.

In a flow rate measuring apparatus 4E configured in this manner, if surges including backflows are generated, a portion of the measured fluid (backflow) flows into the fourth bend portion 29 through the second communicating aperture 39 and acts so as to accelerate the measured fluid inside the fourth bend portion 29 through the fifth passage 30 in a direction that discharges it from the outflow aperture 31. The measured fluid is thereby less likely to flow back through the outflow aperture 31. Thus, a backflow will not be detected as a forward flow and give rise to rich errors.

Embodiment 7

Figure 11:
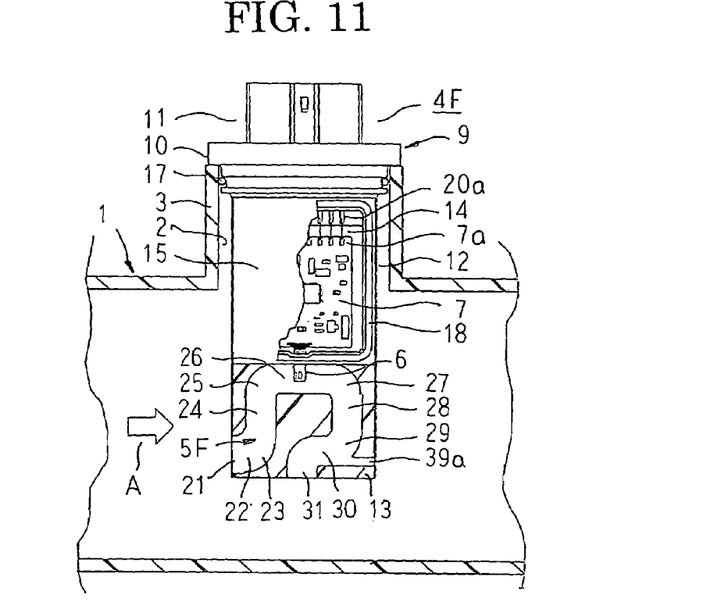
FIG. 11 is a partially cut-away side elevation showing part of a state in which a flow rate measuring apparatus according to Embodiment 7 of the present invention is mounted to a main passage.

FIG. 11 is a partially cut-away side elevation showing part of a state in which a flow rate measuring apparatus according to Embodiment 7 of the present invention is mounted to a main passage.

In FIG. 11, a measuring passage 5F includes a second communicating aperture 39a that is disposed through a measuring passage constituting portion 13 so as to be aligned with a direction of flow A of a main flow, and so as to communicate between a fourth bend portion 29 and a main passage 1 downstream from the measuring passage constituting portion 13.

Moreover, the rest of this embodiment is constructed in a similar manner to Embodiment 6 above except for the fact that the second communicating aperture 39a is used instead of the second communicating aperture 39.

In a flow rate measuring apparatus 4F configured in this manner, if surges including backflows are generated, a portion of the measured fluid (backflow) also flows into the fourth bend portion 29 through the second communicating aperture 39a and acts so as to accelerate the measured fluid inside the fourth bend portion 29 through the fifth passage 30 in a direction that discharges it from the outflow aperture 31. The measured fluid is thereby less likely to flow back through the outflow aperture 31, achieving similar effects to those in Embodiment 6 above.

Embodiment 8

Figure 12:
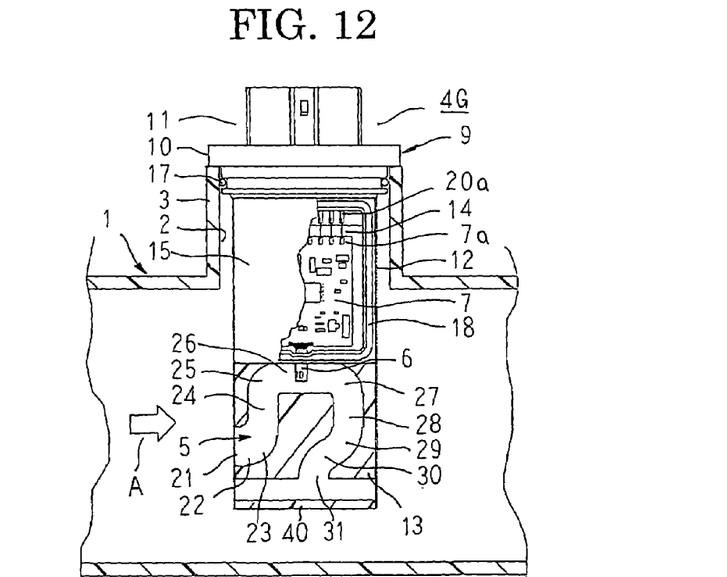
FIG. 12 is a partially cut-away side elevation showing part of a state in which a flow rate measuring apparatus according to Embodiment 8 of the present invention is mounted to a main passage.

FIG. 12 is a partially cut-away side elevation showing part of a state in which a flow rate measuring apparatus according to Embodiment 8 of the present invention is mounted to a main passage.

In FIG. 12, a partitioning wall 40 is formed integrally on the measuring passage constituting portion 13 completely across the measuring passage constituting portion 13 in a direction of flow A of a main flow so as to have a predetermined clearance relative to the projecting end surface of the measuring passage constituting portion 13. In other words, the partitioning wall 40 is disposed facing the outflow aperture 31 of the measuring passage 5 so as to have a predetermined clearance.

Moreover, the rest of this embodiment is configured in a similar manner to Embodiment 1 above.

In automotive internal-combustion engines, the inside diameter of the main passage 1 through which the main flow flows may be large or small depending on the size of the intake air flow required by the internal-combustion engine. When the flow rate measuring apparatus 4 according to Embodiment 1 above is plugged into the main passage 1, a distance between the outflow aperture 31 and an inner wall surface of the main passage 1 may vary depending on the inside diameter of the main passage 1. The degree of influence on the shape, and also on the static pressure, of the flow of measured fluid in the vicinity of the outflow aperture 31 varies depending on the distance between the outflow aperture 31 and the inner wall surface of the main passage 1. As a result, the flow rate measuring properties of the flow rate measuring apparatus 4, in other words, the relationship of output relative to flow rate, vary depending on the inside diameter of the main passage 1, and there are cases in which the strengths of a plug-in form that can unify flow rate measuring properties cannot be used to advantage if the inside diameter of the main passage 1 varies.

In a flow rate measuring apparatus 4G configured in this manner, because the partitioning wall 40 is formed facing the outflow aperture 31 so as to have the predetermined clearance, the distance from the outflow aperture 31 to the facing partitioning wall 40 is always kept constant. The influence of the partitioning wall 40 on the flow can thereby always be kept constant in order to stabilize the static pressure in the vicinity of the outflow aperture 31. Thus, even if the inside diameter of the main passage 1 varies, the flow rate measuring properties can be unified, and the strengths of the plug-in form can be used to advantage.

Embodiment 9

Figure 13:
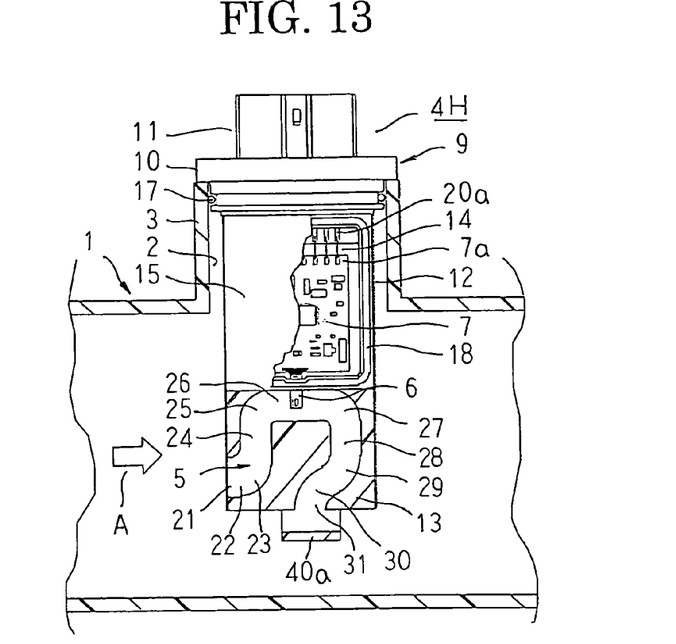
FIG. 13 is a partially cut-away side elevation showing part of a state in which a flow rate measuring apparatus according to Embodiment 9 of the present invention is mounted to a main passage.

FIG. 13 is a partially cut-away side elevation showing part of a state in which a flow rate measuring apparatus according to Embodiment 9 of the present invention is mounted to a main passage.

In FIG. 13, a partitioning wall 40a is formed integrally on a measuring passage constituting portion 13 so as to be disposed on a region of the measuring passage constituting portion 13 facing the outflow aperture 31 so as to have a predetermined clearance relative to the projecting end surface of the measuring passage constituting portion 13.

Moreover, the rest of this embodiment is constructed in a similar manner to Embodiment 8 above except for the fact that the partitioning wall 40a is used instead of the partitioning wall 40.

In a flow rate measuring apparatus 4H configured in this manner, because the partitioning wall 40a is formed facing the outflow aperture 31, similar effects to those in Embodiment 8 above can also be achieved.

Embodiment 10

Figure 14:
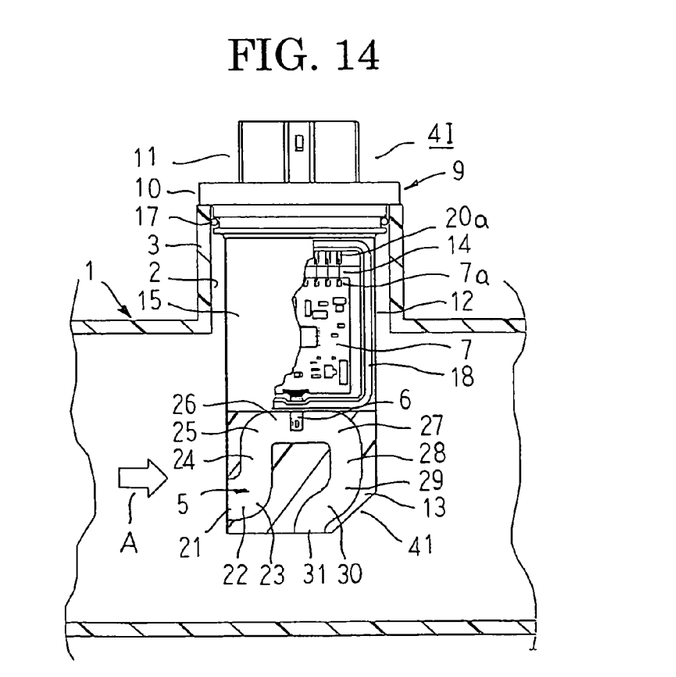
FIG. 14 is a partially cut-away side elevation showing part of a state in which a flow rate measuring apparatus according to Embodiment 10 of the present invention is mounted to a main passage.

FIG. 14 is a partially cut-away side elevation showing part of a state in which a flow rate measuring apparatus according to Embodiment 10 of the present invention is mounted to a main passage.

In FIG. 14, an inclined surface 41 is formed on a downstream end portion of the measuring passage constituting portion 13 so as to extend away from the circuit board 7 to immediately downstream from the outflow aperture 31.

Moreover, the rest of this embodiment is configured in a similar manner to Embodiment 1 above.

In a flow rate measuring apparatus 41 configured in this manner, if surges including backflows are generated, a portion of the measured fluid (backflow) flows along the inclined surface 41 and directly below the outflow aperture 31, accelerating the measured fluid near the outflow aperture 31 upstream. The measured fluid is thereby less likely to flow back into the measuring passage 5 through the outflow aperture 31. Thus, a backflow will not be detected as a forward flow and give rise to rich errors.

Embodiment 11

Figure 15:
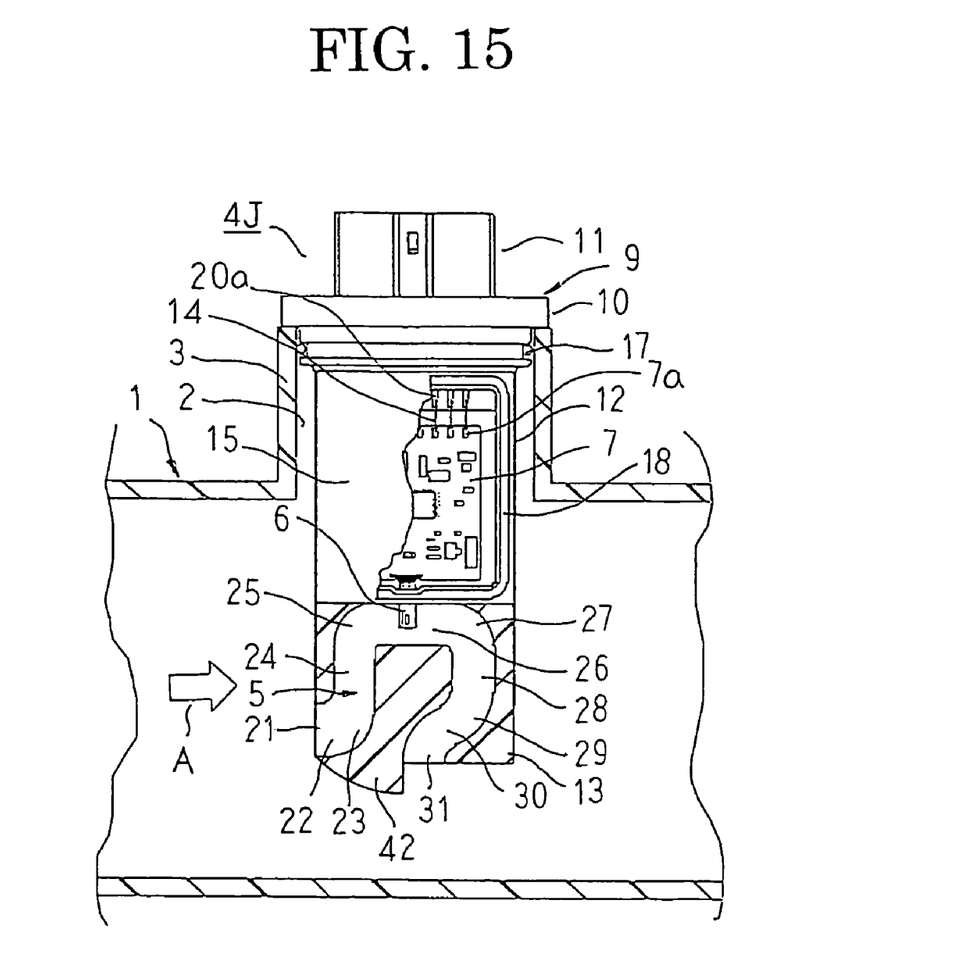
FIG. 15 is a partially cut-away side elevation showing part of a state in which a flow rate measuring apparatus according to Embodiment 11 of the present invention is mounted to a main passage.

FIG. 15 is a partially cut-away side elevation showing part of a state in which a flow rate measuring apparatus according to Embodiment 11 of the present invention is mounted to a main passage.

In FIG. 15, a projecting portion 42 is disposed so as to protrude on the end portion of a measuring passage constituting portion 13 in an upstream vicinity of a outflow aperture 31.

Moreover, the rest of this embodiment is configured in a similar manner to Embodiment 1 above.

In a flow rate measuring apparatus 4J configured in this manner, because the outflow aperture 31 is shielded immediately upstream by the projecting portion 42, a vicinity of an exit of the outflow aperture 31 is less likely to be affected by the flow from upstream, stabilizing static pressure in the vicinity of the exit of the outflow aperture 31.

Consequently, even if the main flow of the measured fluid is disturbed, the dynamic pressure is also stabilized because the static pressure in the vicinity of the exit of the outflow aperture 31 is stable, thereby reducing disturbances to and stabilizing the flow inside the measuring passage 5. The signal-to-noise ratio of output from the flow rate measuring apparatus 4J is thereby improved.

If surges including backflows are generated, the measured fluid (backflow) strikes the projecting portion 42, damping the flow velocity of the backflow and making the measured fluid less likely to flow into the measuring passage 5 through the outflow aperture 31. Thus, a backflow will not be detected as a forward flow and give rise to rich errors.

What is claimed is:

1. A flow rate measuring apparatus comprising:
a main body portion projecting into a main passage, said main body portion having a circuit housing portion disposed internally;
a measuring passage formed on said main body portion at a projecting end of said circuit housing portion, a portion of a measured fluid flowing through said main passage being induced to flow through said measuring passage;
a flow rate detecting element disposed inside said measuring passage;
a control circuit housed inside said circuit housing portion, said control circuit driving said flow rate detecting element and processing a signal therefrom; and
a plate including a wall surface that constitutes said measuring passage, wherein the plate holds the flow rate detecting element and the control circuit,
wherein:
said measuring passage comprises:
an inflow aperture positioned in a vicinity of an end portion of said main body portion in a direction of projection and opening onto a surface of said main body portion that is perpendicular to a direction of flow of a main flow of said measured fluid so as to be facing upstream relative to said direction of flow of said main flow;
an outflow aperture positioned in a vicinity of an end portion of said main body portion in said direction of projection and opening onto a surface of said main body portion that is parallel to said direction of flow of said main flow;
a first passage extending from said inflow aperture in said direction of flow of said main flow to a first bend portion;
a second passage extending from said first bend portion in a direction that is perpendicular to said direction of flow of said main flow toward said circuit housing portion to a second bend portion;
a third passage extending from said second bend portion in said direction of flow of said main flow to a third bend portion; and
a fourth passage extending from said third bend portion in a direction that is perpendicular to said direction of flow of said main flow in a direction away from said circuit housing portion;
said fourth passage is connected to said outflow aperture directly or by means of an additional passage; and
said flow rate detecting element is disposed in said third passage, and
wherein:
said flow rate detecting element and said control circuit are installed so as to be positioned substantially in a common plane with the wall surface of the plate constituting said measuring passage.

2. The flow rate measuring apparatus according to claim 1, further comprising:
a fifth passage connected to said fourth passage by means of a fourth bend portion and connected to said outflow aperture so as to extend from said fourth bend portion in a direction opposite to said direction of flow of said main flow.

3. The flow rate measuring apparatus according to claim 2, wherein:
an outer peripheral wall surface of said second bend portion, said third passage, said third bend portion, said fourth passage, and said fourth bend portion is formed into a continuous arc-shaped surface.

4. The flow rate measuring apparatus according to claim 2, wherein:
a second communicating aperture is formed so as to communicate between said fourth bend portion and a downstream end of said main body portion so as to have an aperture direction that is inclined relative to said direction of flow of said main flow so as to separate gradually away from said circuit housing portion toward an upstream end, or so as to have an aperture direction that is aligned with said direction of flow of said main flow.

5. The flow rate measuring apparatus according to claim 1, wherein:
said fourth passage extends from said third bend portion in a direction that is perpendicular to said direction of flow of said main flow in a direction away from said circuit housing portion and opens onto an end surface said main body portion in said direction of projection to constitute said outflow aperture; and
a passage cross-sectional area expanding portion having a circular cross-sectional shape in a plane including said direction of flow of said main flow and said direction of projection of said main body portion is formed on an upstream side of said fourth passage so as to connect to said fourth passage and said outflow aperture.

6. The flow rate measuring apparatus according to claim 1, further comprising:
a flow contracting portion for continuously constricting a passage cross-sectional area by gradually changing a height of said measuring passage in a thickness direction of said flow rate detecting element from said second passage through said second bend portion to an upstream entrance of said third passage.

7. The flow rate measuring apparatus according to claim 1, further comprising:
an expanding portion for continuously expanding a passage cross-sectional area by gradually changing a height of said measuring passage in a thickness direction of said flow rate detecting element downstream from an upstream entrance of said fourth passage.

8. The flow rate measuring apparatus according to claim 1, wherein:
a flow rate detector portion of said flow rate detecting element is disposed so as to be offset closer to said circuit housing portion than a center of said third passage.

9. The flow rate measuring apparatus according to claim 8, further comprising:
a flow contracting portion for continuously constricting a passage cross-sectional area by gradually changing a height of said measuring passage in a thickness direction of said flow rate detecting element from said second passage through said second bend portion to an upstream entrance of said third passage.

10. The flow rate measuring apparatus according to claim 8, further comprising:
an expanding portion for continuously expanding a passage cross-sectional area by gradually changing a height of said measuring passage in a thickness direction of said flow rate detecting element downstream from an upstream entrance of said fourth passage.

11. The flow rate measuring apparatus according to claim 1, wherein:
a first communicating aperture communicating between said third passage and said main passage is disposed in a downstream vicinity of said flow rate detecting element.

12. The flow rate measuring apparatus according to claim 1, wherein:
a suppressing plate for suppressing a secondary flow is disposed in said second bend portion, and said suppressing plate is provided in its entirety upstream from said flow rate detecting element.

13. The flow rate measuring apparatus according to claim 1, wherein:
a drainage groove is disposed parallel to a wall surface of said third passage facing said circuit housing portion so as to extend from said second bend portion to said third bend portion.

14. The flow rate measuring apparatus according to claim 1, wherein:
a partitioning wall is formed integrally on said main body portion so as to have a predetermined clearance relative to an aperture face of said outflow aperture on said main body portion and to be positioned at least in a region facing said outflow aperture.

15. The flow rate measuring apparatus according to claim 1, wherein:
an inclined surface that extends away from said circuit housing portion to a vicinity of said outflow aperture is formed on a downstream end portion of said main body portion.

16. The flow rate measuring apparatus according to claim 1, wherein said measuring passage is formed so as to have a rectangular passage cross section.

17. The flow rate measuring apparatus according to claim 1, wherein said flow rate detecting element has a flat shape.

18. The flow rate measuring apparatus according to claim 1, wherein the position of the flow rate detecting element is within the main passage.

* * * * *